(12) United States Patent
Wittenberg

(10) Patent No.: US 6,714,157 B2
(45) Date of Patent: Mar. 30, 2004

(54) MULTIPLE TIME-INTERLEAVED RADAR OPERATION USING A SINGLE RADAR AT DIFFERENT ANGLES

(75) Inventor: Peter S. Wittenberg, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/211,778

(22) Filed: Aug. 2, 2002

(65) Prior Publication Data

US 2004/0021600 A1 Feb. 5, 2004

(51) Int. Cl.[7] .......................... G01S 13/89; G01S 13/90
(52) U.S. Cl. ......................... 342/191; 342/25; 342/73; 342/74; 342/79; 342/81; 342/134; 342/147; 342/157; 342/158; 342/176; 342/179; 342/190
(58) Field of Search .................. 342/25, 175, 189–197, 342/73–81, 134–137, 147, 157, 158, 159

(56) References Cited

U.S. PATENT DOCUMENTS

| | | | | |
|---|---|---|---|---|
| 3,790,939 A | * | 2/1974 | Constant | 342/25 |
| 3,808,596 A | * | 4/1974 | Kazel | 342/191 |
| 4,134,113 A | * | 1/1979 | Powell | 342/25 |
| 4,280,127 A | * | 7/1981 | Lee et al. | 342/25 |
| 4,355,311 A | * | 10/1982 | Frosch et al. | 342/25 |
| 4,562,439 A | * | 12/1985 | Peralta et al. | 342/196 |
| 4,748,448 A | * | 5/1988 | Thompson | 342/175 |
| 4,922,254 A | * | 5/1990 | Schuessler et al. | 342/25 |
| 4,926,185 A | | 5/1990 | Wittenberg | |
| 6,356,227 B1 | * | 3/2002 | Gibson et al. | 342/25 |

\* cited by examiner

*Primary Examiner*—Bernarr E. Gregory
(74) *Attorney, Agent, or Firm*—Harness Dickey & Pierce P.L.C.

(57) ABSTRACT

A pulse radar system capable of mapping multiple targets essentially simultaneously using a single radar antenna. By alternately transmitting radar pulses toward multiple targets positioned at different angles relative to the antenna and alternately receiving return signals from the multiple targets as the radar antenna is switched between multiple beam positions, a time-interleaved radar operation is achieved which enables multiples targets to be mapped, and thus tracked, at the same time. A different radio frequency is preferably employed for each target so as to avoid interference and ambiguous returns. Using the teachings of the present invention, between two and twenty radar maps, and possibly more, can be generated simultaneously in approximately the same amount of time required to map a single target using conventional systems of the prior art.

15 Claims, 2 Drawing Sheets

MULTIPLE TIME-INTERLEAVED RADAR OPERATION USING A SINGLE RADAR AT DIFFERENT ANGLES

FIELD OF THE INVENTION

The present invention relates generally to pulse radar systems and, more particularly, to producing multiple radar maps at the same time using a pulse radar system having a single antenna.

BACKGROUND OF THE INVENTION

Surveillance is frequently conducted using pulse radar systems. For example, ground, airborne and satellite-based pulse radar systems are commonly employed for detecting and tracking aircraft, and for mapping and tracking ground targets.

In a conventional pulse radar system, a single radar pulse is transmitted toward a target. The system then waits to receive a return signal for producing a radar map of the target. In order to improve the signal-to-noise ratio of radar maps, multiple return signals from the same target can be combined (e.g., integrated). However, the system timing must be such that a new radar pulse is unambiguous, i.e., not transmitted prior to receiving the return signal from the prior radar pulse, plus an additional wait period to avoid ambiguities (e.g., multiple-time-around echoes) which could otherwise distort the radar map. This transmit and receive timing is shown generally in FIG. 1, which illustrates how the transmit and receive times together account for only a small percentage of the total available timeline.

Certain improvements have been proposed to more efficiently use the available timeline of conventional pulse radar systems. For example, the inventor hereof previously developed a radar system in which multiple radar waveforms operating at different non-interfering frequencies were time-interleaved and transmitted by the same radar antenna so as to reduce the time required for generating a high signal-to-noise ratio map of a single target. However, this and other known systems are limited in the sense that only a single target or region can be mapped at any given time.

SUMMARY OF THE INVENTION

The inventor hereof has succeeded at designing a pulse radar system capable of mapping multiple targets essentially simultaneously using a single radar antenna. By alternately transmitting radar pulses toward multiple targets positioned at different angles relative to the antenna and alternately receiving return signals from the multiple targets as the radar antenna is switched between multiple beam positions, a time-interleaved radar operation is achieved which enables multiples targets to be mapped, and thus tracked, at the same time. In one preferred form of the invention, a different radio frequency is employed for each target so as to avoid interference and ambiguous returns. Using the teachings of the present invention, between two and twenty radar maps, and possibly more, can be generated simultaneously in approximately the same amount of time required to map a single target using conventional systems of the prior art.

According to one aspect of the invention, a method of conducting radar includes transmitting a radar pulse toward a first region using a radar antenna, switching a beam position of the radar antenna from the first region to a second region, transmitting a radar pulse toward the second region, switching the beam position from the second region to the first region, receiving a return signal from the first region, switching the beam position from the first region to the second region, receiving a return signal from the second region, and producing a radar map of the first region and a radar map of the second region using said return signals.

According to another aspect of the invention, a pulse radar system includes an electronically scanned antenna and a computer for controlling switching of the antenna between multiple beam positions. The system is configured to a alternately transmit radar pulse s toward multiple targets positioned at different angles relative to the antenna and to alternately receive return signals from the multiple targets as the antenna is switched between the multiple be am positions, and to generate radar maps of the multiple targets using the return signals.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
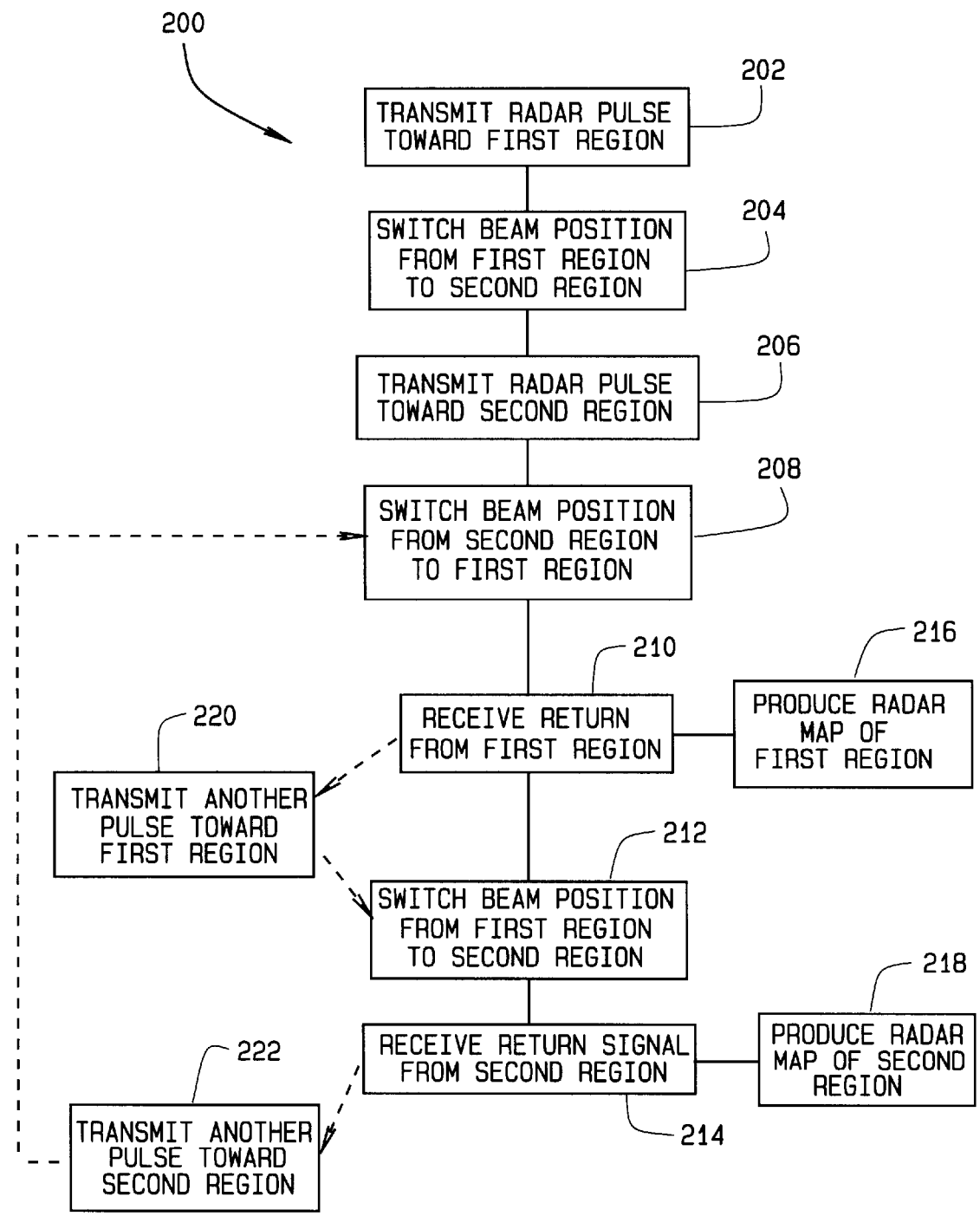
FIG. 2 is a flow diagram of a method according to one preferred embodiment of the present invention.

A method of conducting radar according to one preferred embodiment of the present invention is illustrated in FIG. 2 and referred to generally by reference character 200. As indicated at step 202 of FIG. 2, the method 200 begins with transmitting a radar pulse toward a first region/target using a radar antenna. The radar antenna is preferably an electronically scanned antenna. The method continues at step 204, where a beam position of the radar antenna is switched from the first region to a second region. At step 206, a radar pulse is transmitted toward the second region. The beam position is then switched from the second region to the first region, as indicated at step 208, to enable a return signal from the first region to be received, as indicated at step 210. The beam position is then switched back to the second region, as indicated at step 212, to enable a return signal from the second region to be received, as indicated in step 214. The return signals are used to produce a radar map of the first region and a radar map of the second region virtually simultaneously, as indicated in steps 216, 218 of FIG. 2.

Although the method 200 has been described thus far as mapping only two regions, it should be understood that the teachings of the present invention can be readily expanded to mapping a much larger number of targets/regions at the same time, as further explained below.

Optionally, multiple return signals from each target/region may be combined (e.g., integrated) in order to improve the signal-to-noise ratios of the generated radar maps. In such a case, once the return signal from the first region is received in step 210 of FIG. 2, the method 200 preferably proceeds to step 220, where another radar pulse is transmitted toward the first target. The method then proceeds to steps 212 and 214 explained above. Once the return signal is received from the second region in step 214, the method 200 then proceeds to step 222 where another radar pulse is transmitted toward the second region. Thus, each time the beam position of the antenna is switched and a return signal is received from a target, the antenna preferably transmits another pulse toward such target before switching to another beam position for receiving a return signal from a different target.

In addition, rather than transmitting a single pulse toward a particular target prior to switching beam positions, multiple pulses having different non-interfering frequencies can be transmitted toward the same target during the same or multiple pulse intervals. The return signals from such pulses can then be combined (e.g., integrated) to improve the signal-to-noise ratio of the generated map, and to average the effects of constructive and destructive interference, as disclosed in U.S. Pat. No. 4,926,185, the disclosure of which is incorporated herein by reference.

In the case where a synthetic aperture radar (SAR) mode is desired, the radar antenna is preferably switched coherently between the multiple beam positions. In other words, the radar system maintains phase with previously transmitted pulses as the antenna is switched between multiple beam positions so as to facilitate correct interpretation of Doppler information embodied in the return signals. Radar systems having coherent switching agility are already known in the art and thus will not be described further herein.

Though not shown in FIG. 2, the method 200 may further include displaying the generated radar maps using one or more display devices, if desired.

Figure 1:
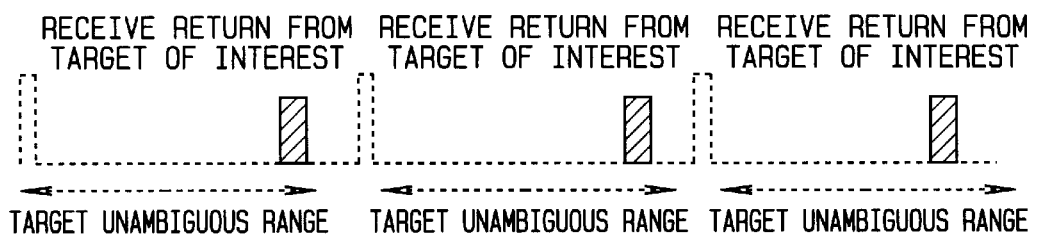
FIG. 1 is a timing diagram illustrating the transmit and receive operation of a conventional pulse radar system.
Figure 3A:
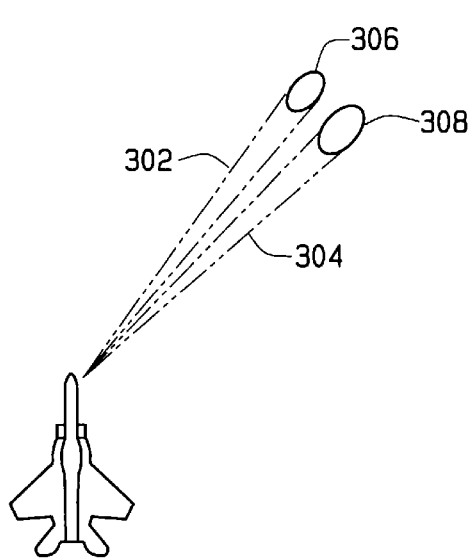
FIGS. 3a and 3b illustrate simultaneous mapping of two targets and eight targets, respectively, using the teachings of the present invention.

FIG. 3a illustrates an airborne radar application of the present invention in which a radar antenna is alternately switched between a first beam position 302 and a second beam position 304 for mapping two different targets 306, 308 essentially simultaneously.

Figure 3B:
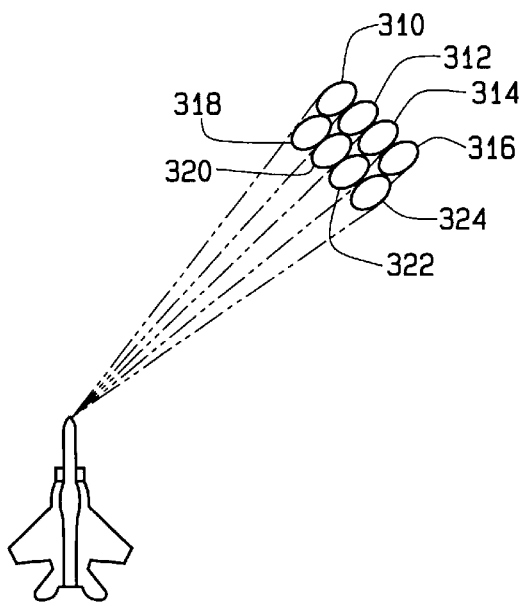

FIG. 3b illustrates a similar application of the present invention in which eight different regions 310–324 are simultaneously mapped using a single radar antenna. Although the targets 306–324 are illustrated as distinct and adjacent areas in FIGS. 3a and 3b, some or all of them may overlap one another, or may be spaced well apart from other targets. In addition, such targets 306–324 may be either stationary or moving targets on the ground or airborne, or a combination thereof.

Figure 4:
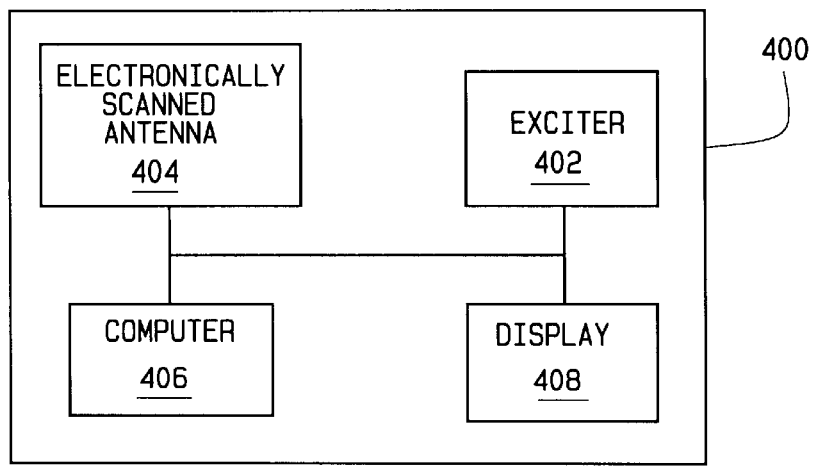
FIG. 4 is a diagram of a preferred pulse radar system for implementing the method of FIG. 2.

FIG. 4 illustrates one preferred pulse radar system 400 for implementing the method of FIG. 2. As shown in FIG. 4, the system 400 includes an exciter 402, an electronically scanned antenna 404, a computer 406 and a display 408. In operation, the electronically scanned antenna 404 transmits radar pulses generated by the exciter 402. The computer 406 is provided for, among other things, switching the beam position of the antenna 404 between multiple targets positioned at different azimuth and/or elevation angles relative to the antenna. The computer 406 also generates radar maps from the return signals, and displays one or more of such maps to a user via the display 408.

The exciter 402 is preferably a multi-frequency exciter, and the radar pulses transmitted toward any particular target preferably have a different frequency (or frequencies) than pulses transmitted toward other targets. In this manner, pulses transmitted toward one target should not interfere with pulses transmitted toward other targets, and vice versa, so as to avoid ambiguities. As a result, multiple independent radars can be realized while using only a single radar antenna. Although illustrated as distinct functional units, it should be -understand that one or more of the components shown in FIG. 4 may be integrated into another component without departing from the scope of the invention.

In one embodiment, the computer 406 is configured to operate in a SAR mode, and therefore maintains coherency with previously generated radar pulses during repeated switching of the antenna so as to enable processing of Doppler information embodied in the return signals. Where SAR mapping is required for an area larger than a single beamwidth, the multiple map capability of the present invention reduces the mapping time required by a factor of two to twenty. For close surveillance, this improvement in time will result in increased survivability of the surveillance platform. For longer range surveillance, where survivability is not the critical issue, the improvement will be realized as increased coverage (e.g., in terms of square miles/day) by a factor of two to twenty.

A radar system utilizing the teachings of the present invention will be capable of producing between two and twenty maps, and possibly more, at the same time, and during the same amount of time required by conventional pulse radar systems to generate a single map. The exact number of maps that can be generated simultaneously in any given implementation will be a function of the geometry of each target relative to the antenna, as well as the radar exciter settling time and the electronically scanned antenna switching time. Additionally, by mapping multiple targets at the same time, the present invention likewise enables simultaneous tracking of multiple targets.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of conducting radar, the method comprising:
transmitting a radar pulse toward a first region using a radar antenna;
switching a beam position of the radar antenna from the first region to a second region before receiving a return signal from the radar pulse transmitted toward the first region;
transmitting a radar pulse toward the second region;
switching the beam position to the first region before receiving a return signal from the radar pulse transmitted toward the second region;
receiving the return signal from the radar pulse transmitted toward the first region;
switching the beam position to the second region;
receiving the return signal from the radar pulse transmitted toward the second region; and
producing a radar map of the first region and a radar map of the second region using said return signals.

2. The method of claim 1, wherein the radar antenna is an electronically scanned antenna.

3. The method of claim 2, wherein the radar pulse transmitted toward the first region has a first frequency and the radar pulse transmitted toward the second region has a second frequency which is non-interfering with the first frequency.

4. The method of claim 3, further comprising displaying at least one of the radar map of the first region and the radar map of the second region on a display device.

5. The method of claim 2, wherein switching includes coherently switching the beam position of the radar antenna.

6. The method of claim 2, further comprising transmitting another radar pulse toward the first region after receiving the return signal from the first region and prior to receiving the return signal from the second region.

7. The method of claim 2, further comprising switching the beam position from the second region to a third region prior to receiving the return signal from the first region, transmitting a radar pulse toward the third region, receiving a return signal from the third region, and producing a radar map of the third region using the return signal received therefrom.

8. The method of claim 2, wherein the first region overlaps the second region.

9. The method of claim 1 further comprising:
using a computer-readable medium having computer-executable instructions for performing, in conjunction with a computer device, the method of claim 1.

10. A pulse radar system comprising an electronically scanned antenna and a computer for controlling switching of the antenna between multiple beam positions, said system being configured to alternately transmit radar pulses toward multiple targets positioned at different angles relative to the antenna, and to alternately receive return signals from said multiple targets, as said antenna is switched between the multiple beam positions, and to generate radar maps of said multiple targets using the return signals.

11. The system of claim 10, further comprising a multi-frequency exciter for generating radar pulses having multiple distinct frequencies.

12. The system of claim 11, wherein the system is configured to transmit radar pulses having a first frequency toward a first one of said multiple targets, and radar pulses having a second frequency toward a second one of said multiple targets.

13. The system of claim 10, wherein the computer is configured to maintain coherence with previously transmitted radar pulses as the antenna is switched between the multiple beam positions.

14. The system of claim 13, wherein the computer is configured to operate in a SAR mode.

15. The system of claim 10, further comprising a device for displaying at least one of said radar maps.

* * * * *